US010270609B2

(12) United States Patent
Saxena et al.

(10) Patent No.: US 10,270,609 B2
(45) Date of Patent: Apr. 23, 2019

(54) AUTOMATICALLY LEARNING AND CONTROLLING CONNECTED DEVICES

(71) Applicant: BrainofT Inc., Cupertino, CA (US)

(72) Inventors: Ashutosh Saxena, Cupertino, CA (US); Hema Swetha Koppula, Mountain View, CA (US); Chenxia Wu, Menlo Park, CA (US); Ozan Sener, Palo Alto, CA (US)

(73) Assignee: BrainofT Inc., Redwood City, CA (US)

( * ) Notice: Subject to any disclaimer, the term of this patent is extended or adjusted under 35 U.S.C. 154(b) by 955 days.

(21) Appl. No.: 14/725,989

(22) Filed: May 29, 2015

(65) Prior Publication Data
US 2016/0248847 A1 Aug. 25, 2016

Related U.S. Application Data

(60) Provisional application No. 62/120,240, filed on Feb. 24, 2015.

(51) Int. Cl.
*G05B 15/02* (2006.01)
*G06N 99/00* (2010.01)
(Continued)

(52) U.S. Cl.
CPC .......... *H04L 12/2803* (2013.01); *G05B 15/02* (2013.01); *G06N 99/005* (2013.01);
(Continued)

(58) Field of Classification Search
CPC . H04L 12/2803; H04L 12/2829; H04L 67/12; H04L 67/18; G05B 15/02; G05B 2219/2642; G06N 99/005
See application file for complete search history.

(56) References Cited

U.S. PATENT DOCUMENTS 5,572,627 A * 11/1996 Brown ................. G06N 99/005
706/10
8,996,429 B1   3/2015 Francis, Jr. et al.
(Continued)

FOREIGN PATENT DOCUMENTS

CN    1209724 C    7/2005
CN    103327080 A    9/2013
(Continued)

OTHER PUBLICATIONS

Koppula et al., Anticipatory Planning for Human-Robot Teams, 14th International Symposium on Experimental Robotics (ISER), Jun. 2014.

*Primary Examiner* — Ronald D Hartman, Jr.
(74) *Attorney, Agent, or Firm* — Van Pelt, Yi & James LLP

(57) ABSTRACT

A first input is received from a plurality of sensors. A first state including a first location based on the first input is determined. The first state is associated with a first probability. A second input is received from the plurality of sensors. A second state including a second location is determined based on the second input associated with a second probability. It is determined that the second state corresponds to an actual state based on a transition model and the second probability. The transition model associates the first state with the second state and indicates a likelihood of a transition from the first state to the second state. A rule to change a state of at least one network connected device is triggered based on the second state.

22 Claims, 7 Drawing Sheets

(51) Int. Cl.
*H04L 12/28* (2006.01)
*H04L 29/08* (2006.01)

(52) U.S. Cl.
CPC .......... *H04L 12/2829* (2013.01); *H04L 67/12* (2013.01); *H04L 67/18* (2013.01); *G05B 2219/2642* (2013.01)

(56) References Cited

U.S. PATENT DOCUMENTS

| | | | |
|---|---|---|---|
| 9,431,021 B1 | 8/2016 | Scalise | |
| 9,734,839 B1 | 8/2017 | Adams | |
| 9,904,709 B2* | 2/2018 | Krumm | G06F 17/30522 |
| 9,921,559 B2* | 3/2018 | Tsubota | G05B 19/00 |
| 2001/0021900 A1 | 9/2001 | Kassmann | |
| 2007/0006098 A1* | 1/2007 | Krumm | G06F 17/3087 |
| | | | 715/825 |
| 2008/0114564 A1* | 5/2008 | Ihara | G06F 17/30321 |
| | | | 702/158 |
| 2010/0131446 A1 | 5/2010 | Firminger | |
| 2011/0125503 A1 | 5/2011 | Dong | |
| 2011/0225155 A1 | 9/2011 | Roulland | |
| 2012/0163603 A1* | 6/2012 | Abe | G01S 5/0263 |
| | | | 380/278 |
| 2012/0304007 A1 | 11/2012 | Hanks | |
| 2013/0073293 A1 | 3/2013 | Jang | |
| 2013/0151543 A1 | 6/2013 | Fan | |
| 2014/0039888 A1 | 2/2014 | Taubman | |
| 2015/0019714 A1 | 1/2015 | Shaashua | |
| 2015/0025890 A1 | 1/2015 | Jagatheesan | |
| 2015/0142704 A1 | 5/2015 | London | |
| 2015/0148919 A1 | 5/2015 | Watson | |
| 2015/0242415 A1 | 8/2015 | Martini | |
| 2016/0004501 A1 | 1/2016 | Kar | |
| 2016/0210680 A1 | 7/2016 | Pulliam | |
| 2016/0217674 A1* | 7/2016 | Stewart | G08B 21/187 |
| 2016/0358065 A1* | 12/2016 | Gedge | G06N 3/006 |
| 2016/0364617 A1 | 12/2016 | Silberschatz | |
| 2017/0234562 A1 | 8/2017 | Ribbich | |
| 2017/0278514 A1 | 9/2017 | Mathias | |
| 2017/0364817 A1* | 12/2017 | Raykov | G01J 5/0025 |
| 2018/0288159 A1 | 10/2018 | Moustafa | |

FOREIGN PATENT DOCUMENTS

| | | |
|---|---|---|
| CN | 103825920 A | 5/2014 |
| EP | 2328131 A2 | 6/2011 |
| WO | 2014130568 A1 | 8/2014 |

* cited by examiner

AUTOMATICALLY LEARNING AND CONTROLLING CONNECTED DEVICES

CROSS REFERENCE TO OTHER APPLICATIONS

This application claims priority to U.S. Provisional Patent Application No. 62/120,240 entitled AUTOMATICALLY LEARNING AND CONTROLLING CONNECTED DEVICES filed Feb. 24, 2015 which is incorporated herein by reference for all purposes.

BACKGROUND OF THE INVENTION

Network connected devices (e.g., Internet of Things (i.e., IoT) devices) allow remote control and automation of the devices within an environment (e.g., home). However, these devices are often not capable of being fully autonomous. Often users must manually operate the devices in a remote control fashion, or users manually create rules that try to mimic autonomous operations. Additionally, IoT devices are often light functionality devices that do not include enough processing power to perform many types of autonomous decisions. Even if it was possible to perform autonomous operations for a single device, device functionality may be improved by sharing information across many different types of devices. Therefore there exists a need for a way to automate functionality of network connected devices in a generalizable and efficient manner.

BRIEF DESCRIPTION OF THE DRAWINGS

Various embodiments of the invention are disclosed in the following detailed description and the accompanying drawings.

DETAILED DESCRIPTION

Figure 1A:
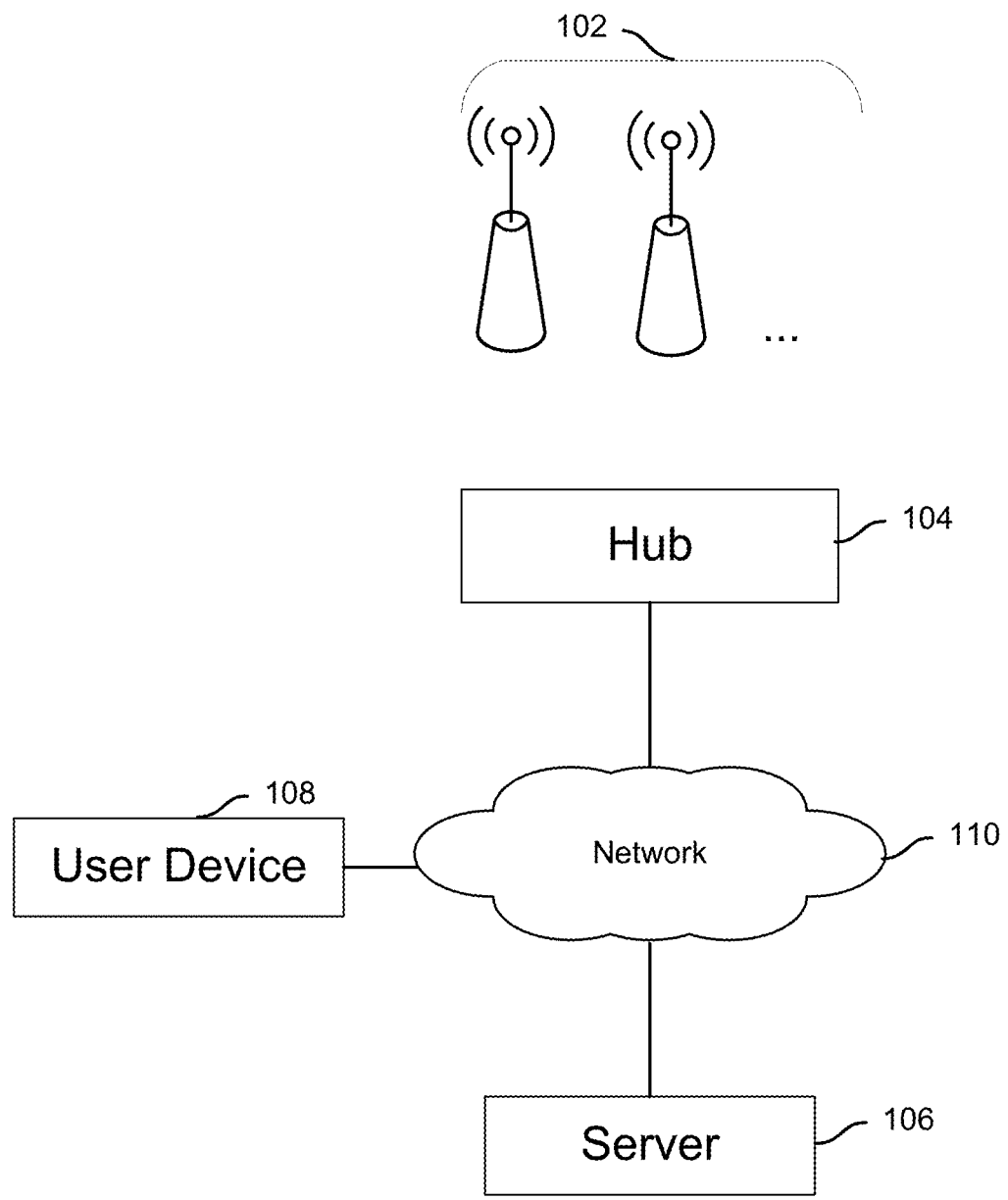
FIG. 1A is a diagram illustrating an embodiment of a system for automatically controlling network devices.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Controlling network connected devices is disclosed. A first input from a plurality of network connected devices and/or sensors is received. For example, data from a motion sensor (e.g., infrared motion sensor), a camera, a microphone, a temperature sensor, etc. installed in a home is received. Examples of the sensor includes a detector for detecting a chemical characteristic and/or a physical characteristic (e.g., movement, switch position, temperature, etc.). The sensor may be integrated in a network connected device (e.g., integrated in a network connected thermostat). A first state of a subject is determined based at least in part on the first input. The first state is associated with a first probability. For example, a location and an action of a subject (e.g., sitting, sleeping, standing, etc.) within an environment is desired to be known. Examples of the subject may include a human, an animal (e.g., pet), a robot, and/or other living or non-living object. However, because it is difficult to determine with absolute certainty the exact location and action of the person, the first probability may identify the probability of certainty that the first state associated with the location and action is correct based on the first input. In some embodiments, the first state has been identified as a first valid state of the subject. For example, the first state is associated with a largest probability among a plurality of possible states associated with the first input. A second input is received from the plurality of sensors. For example, the second input is received subsequent to the first input and detects a state change of a same subject. A second state is determined based at least in part on the second input. The second state is associated with a second probability. In some embodiments, the second state is a possible new state of the subject (e.g., person) and the second state may identify the probability of certainty that an updated location and/or action of the subject associated with the second state is correct. A transition model associates the first state with the second state, indicating a likelihood (e.g., a probability) of a transition from the first state to the second state. For example, once a subject is determined to be in the first state, the possible next state of the subject is constrained based on the starting first state. A level of confidence that the second state corresponds to an actual state is achieved based on at least the transition model and the second probability. A rule to modify a behavior of a network connected device is triggered based on the second state. For example, an IoT device is switched on based on a determination that the second state is a precondition to trigger the rule to switch on the IoT device.

FIG. 1A is a diagram illustrating an embodiment of a system for automatically controlling network devices. Devices 102 includes one or more network connected devices including sensor devices and controllable devices (e.g., IoT devices). Examples of one or more controllable devices included in devices 102 include a switch, a door lock, a thermostat, a light bulb, a kitchen/home appliance, a camera, a speaker, a garage door opener, a window treatment, a fan, an electrical outlet, a light dimmer, an irrigation system, and any other device able to be connected to a computer network. Examples of one or more sensor devices included in devices 102 include a switch, a camera, a motion detector, a light detector, an accelerometer, an infrared detector, a thermometer, an air quality sensor, a smoke detector, a microphone, a humidity detector, a door sensor, a window sensor, a water detector, a glass breakage detector, and any other sensor.

Hub 104 communicates with devices 102 via a wired and/or wireless connection. For example, a device of devices 102 communicates with hub 104 via a WiFi, Bluetooth, Bluetooth Low Energy, Zigbee, Z-Wave, power-line communication, Ethernet and/or any other local and/or propriety wireless or wired communication protocol. In some embodiments, hub 104 and device 102 have been deployed in the same environment. For example, devices 102 includes devices that have been deployed in a home and hub 104 wirelessly communicates with the devices within the home via a short range wireless signal. In some embodiments, hub 104 facilitates communication and/or control of devices 102 with user device 108 and/or via network 110. For example, user device 108 connects to hub 104 via a direct wireless connection (e.g., Bluetooth, Wifi, etc.) and/or via network 110 to control and view information about a device of devices 102. In another example, user device 108 connects to network 110 to access devices 102 via hub 104 and/or server 106. In some embodiments, one or more devices/sensors of devices 102 report information to hub 104 that in turn provides the reported information to server 106 via network 110 for processing. In some embodiments, one or more devices and/or sensors of devices 102 directly communicate with network 110 without being routed via hub 104. For example, a device includes a Wifi and/or cellular radio to directly access network 110.

Examples of user device 108 include a laptop computer, a smartphone, a tablet computer, a desktop computer, a wearable device, a smartwatch, and any other electronic computing device of a user. In some embodiments, information from user device 108 is provided to server 106 and/or hub 104 to enable automation of devices 102. For example, a GPS location detected by user device 108 is provided to hub 104 and/or server 106 as a sensor input to determine and/or trigger device automation rules. In some embodiments, information associated with a device of devices 102 is provided to user device 108. For example, a detected alert of a device of devices 102 is provided to user device 108 via hub 104 and/or server 106. Server 106 may be a part of a cloud computing infrastructure to process and/or store information associated with devices 102 to enable control and management of devices 102. In some embodiments, hub 104 functions as an interface and a control hub to automatically control devices 102. Although storage elements have not been explicitly shown in FIG. 1A, any of the shown components may include a local storage and/or access a locally connected and/or remote storage.

In some embodiments, using the system shown in FIG. 1A, machine learning is performed to automatically learn how users want to interact with one or more controllable devices of devices 102 to autonomously and automatically adjust the controllable devices. In some embodiments, powerful statistical models of user preferences and behaviors are automatically built. For example, sensors of devices 102 and user device 108 are utilized to learn about a user's presence, activities, and behavioral preferences. Controllable devices of devices 102 may be automatically managed and controlled based on the learned data.

In some embodiments, machine learning (e.g., local and/or cloud based) is utilized to integrate input from many different devices/sensors (e.g., devices 102) to build a unique model of a user's presence, activities, and behavior. For example, an environment such as home is installed with devices 102 that can be controlled remotely or locally. The sensors of devices 102 may provide data about the presence and motion of people in an environment, measurements of the environmental properties such as light, temperature and humidity of the house, motion of subjects, and video of different locations of the environment. In some embodiments, learning is performed to learn how to automatically control the controllable devices and automatically adjust the controllable devices of devices 102 to match the automatically determined preferences of the users. For example, sensors detect the environmental conditions that trigger changes in the controllable device states (e.g., behavior and interaction with switches, thermostats, and other devices), and devices of devices 102 are commanded autonomously in accordance with automatically learned preferences of the users.

In some embodiments, machine learning is performed for a particular environment by a local hub. For example, hub 104 performs learning for the users of its deployed environment including devices 102. In some embodiments, rather than performing machine learning at a local hub, at least a portion of the machine learning is performed remotely (e.g., cloud-based). For example, machine learning for the environment of hub 104 is performed by server 106. In some embodiments, a backend server performs learning across various different environments and utilizes the result to aid in automatically configuring each local environment.

In some embodiments, hub 104 and/or server 106 includes one or more inference engines that convert sensor data received from one or more devices of devices 102 into state representations (e.g., state of a person's behavior, location, etc.). For example, the inference engine utilizes machine learning algorithms that rely on statistical and/or deep learning techniques. In some embodiments, hub 104 and/or server 106 includes a "vision engine" (e.g., ML Inference) that receives images/video from one or more camera sensors and analyzes the images/video using vision algorithms to infer a subject's (e.g., human, pet, etc.) location, behavior, and activities (e.g., spatial and motion features). In some embodiments, camera video data is analyzed to learn hand gestures of a person that control connected devices to a desired state. In one embodiment, the gestures are learned from statistical demonstrations by the person. In one embodiment, the gestures are learned using deep learning. In some embodiments, output of vision data and the data from other sensor devices are utilized to build a semantic representation containing information about a person's presence, activities, and behavioral preferences.

In some embodiments, in the system shown, the data is sent using an event-driven database architecture. For example, the sensor data is first converted into a compact feature vector before streaming. In some embodiments, the sensor data is cleaned, before streaming, by statistical learning models that model the different types of noise in the system.

In some embodiments, hub 104 and/or server 106 includes one or more "rule engines" that utilize a detected state to trigger one or more automatically determined automation rules. For example, the rule engine consists of rules with pre-conditions and post-conditions and if a certain pre-condition state of the environment is detected, a rule is triggered to cause one or more network connected controllable devices to be placed in the post-condition state. For example, if it is detected that a person is reading a book on a desk, then the system will turn on reading lights.

In some embodiments, server 106 stores various types of information that can be utilized to automatically determine automation rules. For example, sensor data at various points in time as well as device control events of devices 102 (e.g., pressing a light switch, changing a temperature of a thermostat, etc.) are logged. By learning the preferences/configurations desired by users, the preferences/configurations may be recreated when the conditions in the environment match the previously recorded conditions. In some embodiments, statistical models (e.g., transition model) of the control action of devices are determined. For example, when a network connected light bulb is turned on or off, the associated environmental conditions (e.g., user location, action, time of day, etc.) and associated controllable device status are stored. In some embodiments, which state vector maps to which control action of controllable devices is learned. In some embodiments, a learning method learns the weight of a function that maps the value of the state vector to the state change of controllable devices. In some embodiments, a learning method uses deep learning in order to learn a multi-staged non-linear mapping from the state vector to the state changes of controllable devices. In some embodiments, feedback from the user regarding an action of an automatically triggered rule is received in the form of a reward, and reinforcement learning is used to automatically modify the control rule.

In some embodiments, certain alarming or important events are detected and the data is stored. For example, a break-in is detected as an unusual event, and in response, output alerts are generated including an alert that sent to a smartphone and activation of a siren. In another example, a baby climbing out of a crib is detected. Unlike manually set alarms, the automatically detected unusual events may be detected based on statistical modeling of events using sensor data.

In some embodiments, in response to detecting an event, an output response (e.g., sound, user alert, light alert, wearable alert, etc.) is generated. For example, when it is detected that a stove is left on beyond a threshold amount of time and/or when no human subject is detected as present, the stove is automatically turned off and/or an output alert is generated. In another example when a water leak is detected, an automatic output alert is sent and a water valve is automatically turned off. In another example, when it is detected a person has fallen and further movement of the person is not detected, an alert to an emergency contact person and/or an emergency authority is automatically sent. In another example, if a presence of a person is detected in a living room during morning times, curtains are automatically opened. In another example, if it is detected that humidity is above a threshold value, a fan is automatically turned on. In another example, a humidifier is automatically switched on/off to maintain a preferred humidity. In another example, when a learned preferred time is reached, a coffee maker is automatically turned on. In another example, a dishwasher is automatically scheduled to be operated at a time when energy rates are relatively lower. In another example, light intensity is automatically adjusted based on a time of day (e.g., lights turned on a lower intensity when a subject wakes up in the middle of the night to use the bathroom.). In another example, music is automatically turned when it is detected that a subject is eating dinner. In another example, when it is detected that ambient temperature and humidity are above threshold values and a subject is detected as sitting, a fan is automatically turned on.

One or more of the following may be included in network 110: a direct or indirect physical communication connection, mobile communication network, Internet, intranet, Local Area Network, Wide Area Network, Storage Area Network, a wireless network, a cellular network, and any other form of connecting two or more systems, components, or storage devices together. Additional instances of any of the components shown in FIG. 1A may exist. For example, multiple hubs may be deployed and utilized in a single environment. Multiple user devices may also be utilized to receive user associated information and/or control devices of the same environment. Server 106 may be one of a plurality of distributed servers that process network connected device data. In some embodiments, components not shown in FIG. 1A may also exist.

Figure 1B:
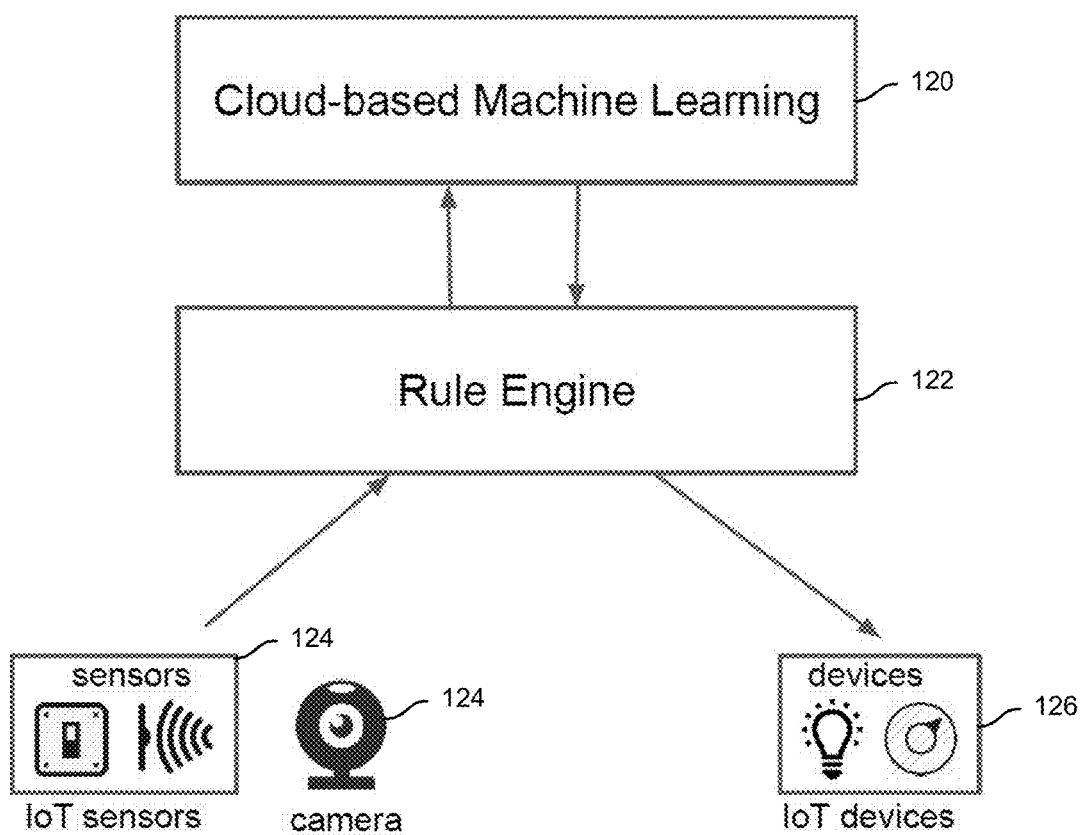
FIG. 1B is a diagram illustrating an embodiment of interactions between components for automatically controlling network devices.

FIG. 1B is a diagram illustrating an embodiment of interactions between components for automatically controlling network devices. Cloud-based machine learning module 120 communicates with rules engine 122. Rules engine 122 receives input from sensors 124 and controls devices 126. Examples of cloud-based machine learning module 120 includes one or more modules for performing machine learning discussed in conjunction with FIG. 1A. Examples of rules engine 122 includes one or more "rule engines" of hub 104 and/or server 106 of FIG. 1A. Sensors 124 and/or controls devices 126 may be included in devices 102 of FIG. 1A.

Figure 1C:
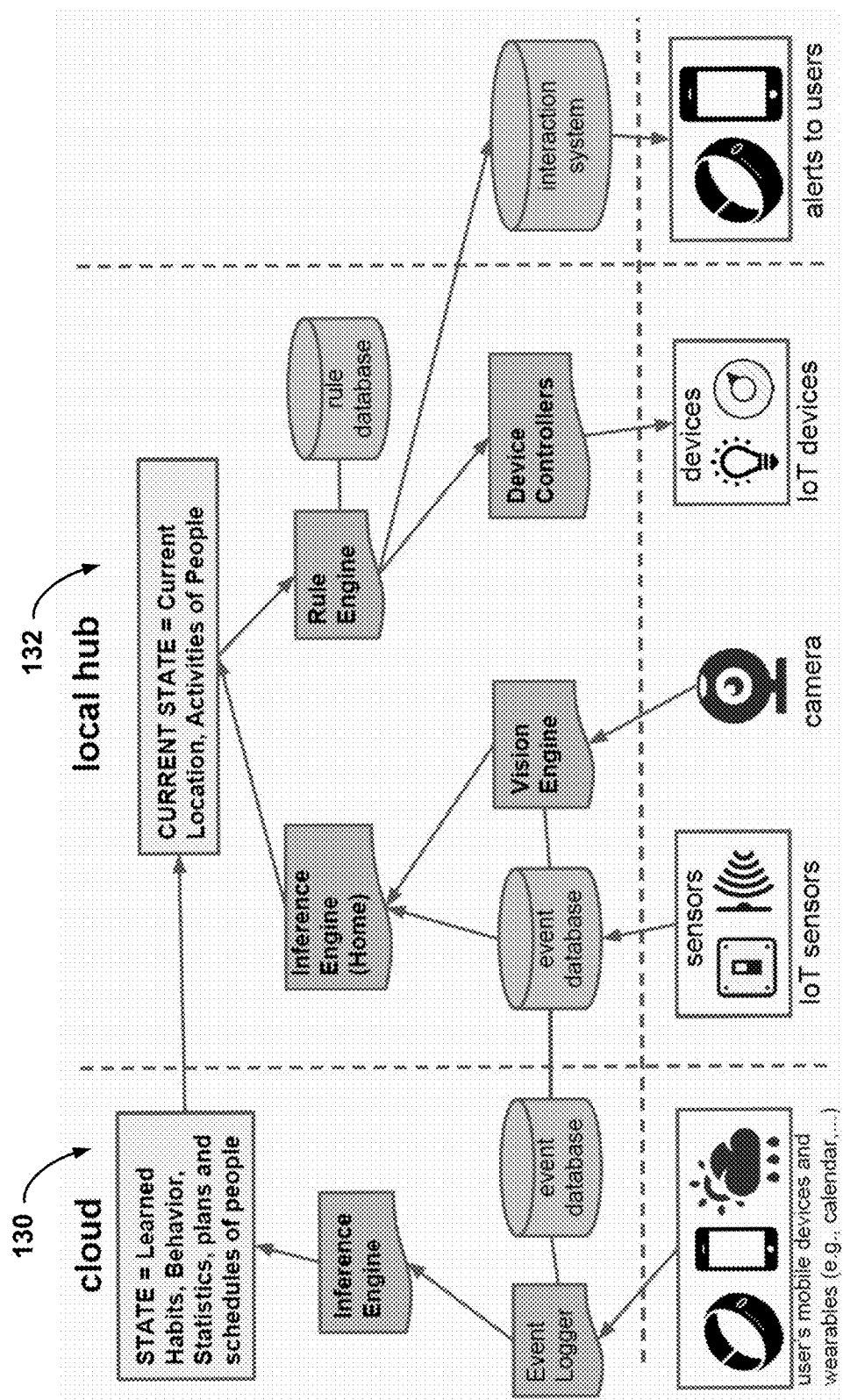
FIG. 1C is a diagram illustrating an embodiment of sub components of a system for automatically controlling network devices.

FIG. 1C is a diagram illustrating an embodiment of sub components of a system for automatically controlling network devices. In some embodiments, components 130 of the cloud shown in FIG. 1C may be included in server 106 of FIG. 1A. In some embodiments, components 132 of the local hub shown in FIG. 1C may be included in hub 104 of FIG. 1A.

Figure 2:
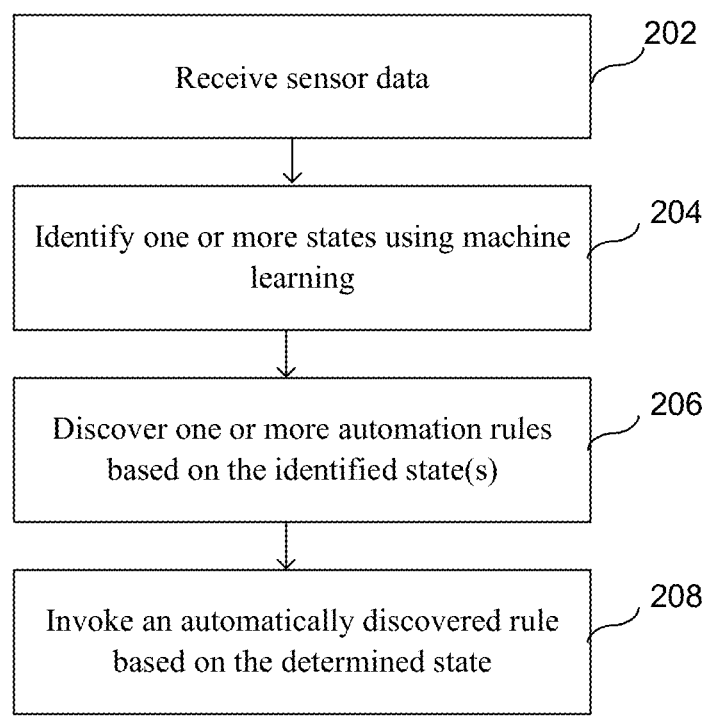
FIG. 2 is a flowchart illustrating an embodiment of a process for automatically learning and applying device control rules.

FIG. 2 is a flowchart illustrating an embodiment of a process for automatically learning and applying device control rules. The process of FIG. 2 may be at least in part performed by hub 104 and/or server 106 of FIG. 1A.

At 202, sensor data is received. In some embodiments, the received sensor data includes data from one or more sensor devices of devices 102 of FIG. 1A. For example, data from a switch, a camera, a motion detector, a light detector, an accelerometer, an infrared detector, a thermometer, an air quality sensor, a smoke detector, a microphone, a humidity detector, a door sensor, a window sensor, a water detector, a glass breakage detector, and any other sensor monitoring an environment is received. In some embodiments, the sensor data includes data from a user device (e.g., user device 108 of FIG. 1A). For example, data from a sensor on the user device (e.g., location sensor, GPS, accelerometer, heart rate sensor, orientation sensor, microphone, gyroscope, etc.) is received. In another example, the data from the user device includes status data and/or user specified data. In some embodiments, the sensor data includes data from one or more controllable devices. For example, a status, a configuration, a functional state, a parameter, and/or any other data of a controllable device of devices 102 of FIG. 1A is received. In some embodiments, the sensor data is received periodically. For example, a sensor device sends currently detected sensor data periodically. In some embodiments, the sensor data is received dynamically. For example, the sensor data is received when sensor data has been detected. In some embodiments, the received sensor data is received from a plurality of sensor devices. In some embodiments, the sensor data is received at a hub (e.g., hub 104 of FIG. 1A) and the sensor data is shared/sent to another hub and/or sent to the computing cloud for processing (e.g., sent to server 106 of FIG. 1A).

At 204, one or more states are identified using machine learning. In some embodiments, machine learning is performed using the received sensor data. In some embodiments, performing machine learning includes utilizing a recursive hidden Markov model and/or expectation maximization. In some embodiments, each state is associated with discrete categories of information desired to be detected using machine learning. For example, an activity currently being performed by a person is desired to be detected among a plurality of possible activities able to be detected. This may be achieved by analyzing camera video/image data to detect a person and activity performed by the person. In some embodiments, a state for each detected subject is determined. In some embodiments, by reducing the sensor data to one or more specific states, the sensor data is reduced to meaningful variable values that can be utilized to determine one or more automation rules. In some embodiments, the state may be in a form of a vector. For example, the state vector includes a grouping of values. In some embodiments, the state vector includes one or more of the following: a time value, a weather forecast, a date value, and other data associated with time and/or environment conditions.

In many cases, it is difficult to determine a specific state with complete accuracy. For example, using the sensor data, it may be difficult to determine the exact location and activity of a subject. In some embodiments, a likelihood/probability that the determined state is correct is determined. For example, a certain state may be one of a plurality of different possible states and the probability that each possible state is the correct state is determined. In some embodiments, in order to determine the probability, machine learning (e.g., statistical and/or deep learning) may be performed. For example, statistical and/or deep learning models of correlations between sensor data and a potential state, a previous state and the potential state (e.g., transition model), and associations between different states/state components are built and utilized to determine an overall likelihood/percentage for each candidate state.

In some embodiments, the observations in time are utilized as statistical inputs and utilized to estimate a state vector evolving in time. The state vector may be the output of an inference engine that converts the sensor data into information about a detected subject presence, activities, etc. In one embodiment, the dynamic processes of the subjects in the house (e.g., human and pet) and their motions are modeled. In one embodiment, deep learning is utilized to learn non-linear relations. In some embodiments, sounds captured from microphone sensors are utilized to infer the number of people, their location, and their activities. In one embodiment, statistical models are utilized to relate sound to the aforementioned state vector.

In some embodiments, a state vector including the activity state (e.g., general activity state—reading, sleeping, cooking, etc. and detailed activity state—reading-opening-book, placing-book-down, etc.) of a subject is estimated. In one embodiment, the state vector includes other relevant information such as time-of-the-day, weather, number of people in the house, subject locations, and current activities being performed. In some embodiments, the state vector includes one or more controllable device states. In some embodiments, the state vector includes a listing of subjects with each region (e.g., room) of an environment. In some embodiments, a learning method learns the weight of a function that maps the values of the sensor data to the state vector. In some embodiments, a learning method utilizes deep learning to learn a multi-staged non-linear mapping from the sensor data to the state vector.

In some embodiments, data from the sensors and/or cameras are analyzed in order to predict what activities the person may perform or locations the person may go. Based on the activity and/or location prediction, anticipatory actions may be taken. For example, if a user starts moving towards a reading desk, it is predicted that the user will go to the reading desk to read and a network connected light will turn on even before the user starts reading.

At 206, one or more automation rules are discovered based on the identified state(s). For example, once it has been observed that an identified state is correlated with a certain controllable device state/status/action, a rule that places the controllable device into the associated state/status/action when the associated state is detected is created. Correlation between a determined state and a detected controllable device state/status/action may be identified and once the correlation reaches a threshold, an automation rule is dynamically created and/or updated. In some embodiments, a correlation between a group of states and/or a range of state values with a controllable device state/status/action is identified and utilized to generate an automation rule. In some embodiments, the probability measure of each state may be utilized when determining the correlations and/or automation rules. In some embodiments, a history of determined states and associated probability values and co-occurring controllable device states/status/actions over time are stored and analyzed using machine learning (e.g., statistical and/or deep learning) to discover correlations. In the event a measure of correlation is above a threshold value, a corresponding automation rule may be created/updated. In some embodiments, automation rules are continually added/updated based on new correlations that are discovered.

In some embodiments, the rules in the rule engine that control the devices are automatically learned. In one embodiment, the rules are formulated as a reinforcement learning problem in order to learn the policy. In one embodiment, the execution of the policy is performed using proportional-derivative controllers. The rule engine may take actions (e.g., changing the state of the devices) based on triggering state vector and sensor information. In one embodiment, parameters of a machine learning algorithm are modified using online stochastic gradient algorithms. The rule engine may take into account data from a user device, web services, weather services, calendar events, and other data sources to learn and/or trigger rules.

At 208, an automatically discovered rule is invoked based on the determined state. For example, a triggering condition of the automatically discovered rule is the identified state, and the rule is invoked to modify a state/status/function/ action of a controllable device to be as specified by the rule. In some embodiments, the triggering condition of the rule is a plurality of different states and/or a range of states. In some embodiments, a plurality of rules are applied/triggered based on the determined state. In some embodiments, the applied rule is inconsistent with another rule to be applied. For example, one rule specifies that a light switch should be turned on while another rule specifies that the light switch should be turned off. In order to resolve conflicts between rules, each rule may be associated with a preference value that indicates a measure of preference of the rule over another rule. In some embodiments, feedback from the user regarding an action of an automatically triggered rule is received in the form of a reward, and reinforcement learning is used to automatically modify the control rule.

Figure 3:
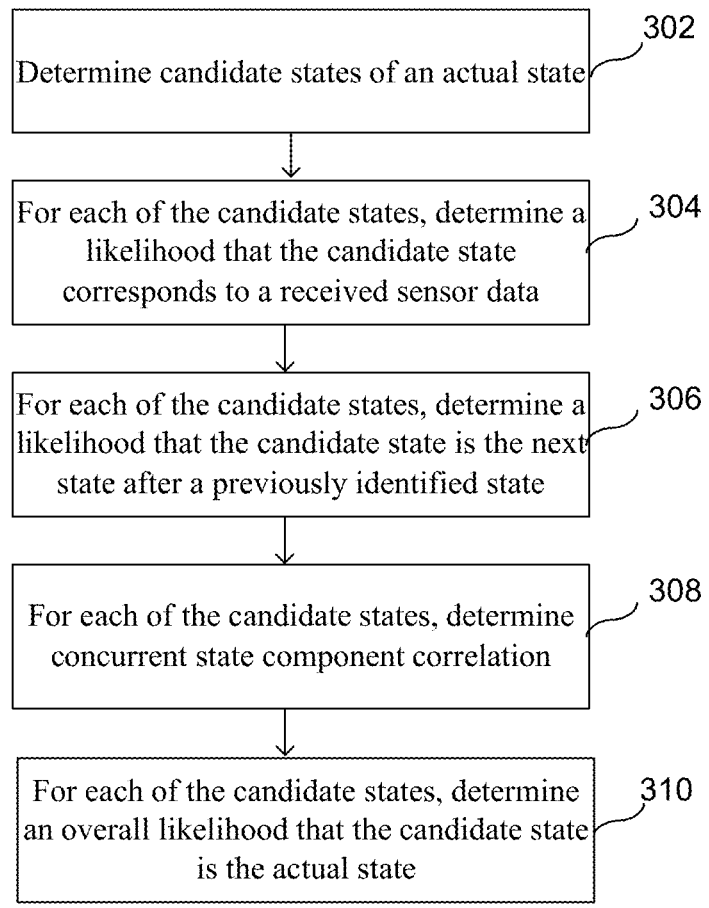
FIG. 3 is a flowchart illustrating an embodiment of a process for determining a likelihood that a detected state is the correct state.

FIG. 3 is a flowchart illustrating an embodiment of a process for determining a likelihood that a detected state is the correct state. The process of FIG. 3 may be at least in part implemented on hub 104 and/or server 106 of FIG. 1A. In some embodiments, the process of FIG. 3 is included in 204 of FIG. 2. In some embodiments, the process of FIG. 3 is performed periodically. In some embodiments, the process of FIG. 3 is performed dynamically. For example, the process of FIG. 3 is performed when new sensor data is received.

At 302, candidate states of an actual state are determined. For example, candidate states that may correspond to a newly received sensor data are identified. In some embodiments, the candidate states are possible states of an actual current state of a subject (e.g., human, animal, etc.). For example, because the exact current state (e.g., location and activity currently being performed) of a subject may be difficult to determine from sensor data with complete accuracy, candidates states (e.g., each candidate state including a location component and an activity component) for a subject are identified.

In some embodiments, determining the candidate states includes identifying all possible states that can be associated with the received sensor data. For example, all possible predefined activities of a subject that can be identified using data from a camera are identified. In some embodiments, determining the candidate states includes identifying the most likely candidate states. For example, rather than identifying all possible states, the most likely candidate states are identified. In some embodiments, the most likely candidate states are identified by analyzing associated sensor data received in 202 of FIG. 2. In some embodiments, determining the candidate states includes identifying a subject associated with newly received sensor data and identifying the last determined state for the subject. In some embodiments, the most likely candidate states are identified based on a previous current state. For example, for a given previous state (e.g., a location of a subject), only certain states are eligible to become the new current state (e.g., only locations adjoining the previous location) and these states are identified.

In some embodiments, a single state includes a plurality of sub states. In some embodiments, each state includes an identifier of a subject, a coarse location of the subject (e.g., which room of a house/building), a specific location of the subject within the coarse location (e.g., on the bed of a bedroom), whether the subject is present within an environment, a type of the subject (e.g., human vs. pet, specific individual, etc.), a coarse activity of the subject (e.g., reading), and the specific activity of a subject (e.g., opening a book). In some embodiments, each candidate state includes a state of a controllable object. In some embodiments, an activity state of a subject is one of predefined activities that can be detected (e.g., detected based on observed/training data).

At 304, for each of the candidate states, a likelihood that the candidate state corresponds to a received sensor data is determined. For example, a probability that a received sensor data corresponds to a particular candidate state is determined. In some embodiments, the likelihood identifies a probability that the candidate state is the actual state given the sensor data. In some embodiments, this likelihood is determined using machine learning. For example, statistical and/or deep learning processing has been utilized to analyze a training data set of example associations between different sensor data and corresponding states to determine associated probabilities of association between different sensor data and different states. In some embodiments, the likelihood that the candidate state corresponds to the received sensor data is determined using a predetermined analysis algorithm. For example, a computer vision pattern recognition algorithm is utilized to analyze camera sensor data and the algorithm provides the likelihood.

At 306, for each of the candidate states, a likelihood that the candidate state is the next state after a previously identified state is determined. For example, a probability that the candidate state is the actual state after a previously determined state of a subject is determined. In some embodiments, this likelihood is determined using machine learning. For example, statistical and/or deep learning processing has been utilized to analyze observed state transitions between different states to determine a transition model of probabilities for each potential candidate state given a previous state. In one example, a motion detector sensor has been installed in each room of a house. The relative locations of the rooms of the house may be automatically determined by using machine learning to observe the pattern of sensor triggers as subjects move from one room to another room. Once the connections between the rooms are known, given a current room location of a subject, the possible adjoining rooms are known and each likelihood that the subject will visit a next room of the possible connected rooms may be determined. For example, given the previous state that indicates a location of a subject, the next state is limited to adjoining rooms that are reachable given the determined/observed rate of movement of the subject and elapsed time between the sensor data of the states.

At 308, for each of the candidate states, concurrent state component correlation is determined. For example, certain candidate state components are more likely included together in the correct state than another grouping of candidate state components. In some embodiments, determining the concurrent state correlation includes determining a probability that one component of the candidate state is included in the correct/actual state given another component of the candidate state. For example, a candidate state includes a location state component and an activity state component, and the probability of the specific activity state component given the specific location state component is determined. In some embodiments, determining the concurrent state correlation includes determining a plurality of probabilities each associated with a different pair combination of state components of the candidate state.

At 310, for each of the candidate states, an overall likelihood that the candidate state is the actual state is determined. For example, for each candidate state, the overall probability that the candidate state is the correct state of a subject is determined. In some embodiments, determining the overall state includes multiplying together one or more of the probabilities determined in 304, 306, and 308. For example, at least a first probability that the candidate state corresponds to a received sensor data, and a second probability that the candidate state is the next state after a previously identified state are multiplied together to obtain the overall likelihood. In some embodiments, the candidate states are sorted based on their overall likelihoods and the candidate state with the best overall likelihood is selected as the actual/correct state.

Figure 4:
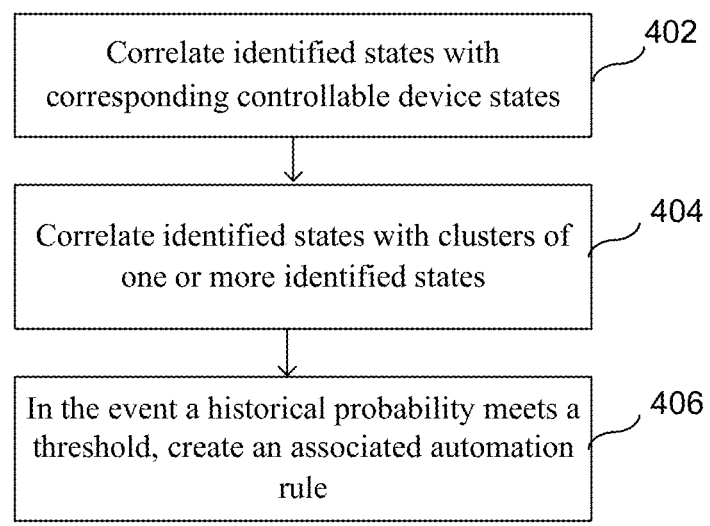
FIG. 4 is a flowchart illustrating an embodiment of a process for automatically discovering an automation rule of a network connected controllable device.

FIG. 4 is a flowchart illustrating an embodiment of a process for automatically discovering an automation rule of a network connected controllable device. The process of FIG. 4 may be at least in part implemented on hub 104 and/or server 106 of FIG. 1A. In some embodiments, the process of FIG. 4 is included in 206 of FIG. 2. In some embodiments, the process of FIG. 4 is performed periodically. In some embodiments, the process of FIG. 4 is performed dynamically. For example, the process of FIG. 4 is performed when a new current state is identified (e.g., at 310 of FIG. 3).

At 402, identified states are correlated with corresponding controllable device states. For example, a state that has been identified as being the actual state of a subject in 310 of FIG. 3 is correlated with a corresponding status, a configuration, a functional state, a parameter, and/or any other data of a controllable device of devices 102 of FIG. 1A. In some embodiments, the identified states are correlated with corresponding controllable device states by analyzing a stored history of identified states and controllable device states to identify controllable device states that correspond with identified states. For example, corresponding pairings between an identified state (e.g., state vector) and a corresponding controllable state (e.g., status, configurations, functional states, parameters, and/or any other data) of a controllable device are determined. In some embodiments, correlating the identified states with corresponding controllable device states includes performing machine learning to discover correlations. For example, statistical and/or deep learning techniques are utilized to discover temporal correlations between identified states and controllable device states. In some embodiments, the identified states include state vectors that may include one or more of the following: a time value, a weather forecast, a date value, and other data associated with time and/or environment conditions. In some embodiments, a historical probability that an identified state corresponds to a specific controllable device state is determined.

At 404, identified states are correlated with clusters of one or more identified states. In some embodiments, similar identified states (e.g., state value within a range) are clustered together and correlated with a controllable device state. For example, identified device states that are associated with physical locations that are close in range with one another are clustered together. This cluster of states is correlated together with one or more corresponding controllable device states. In some embodiments, a cluster probability that a cluster of one or more identified states corresponds to the same controllable device state is determined. The cluster probability may identify a historical probability that any identified state included in the cluster corresponds to the controllable device state. In some embodiments, the cluster probability is determined by at least multiplying together individual probabilities of each identified state (e.g., probability determined in 310 of FIG. 3) of the cluster.

At 406, in the event a historical probability meets a threshold, an associated automation rule is created. For example, if a historical probability determined in 402 and/or a cluster probability determined in 404 is greater than a threshold value (e.g., 80%), a corresponding automation rule is stored in a rule database. In some embodiments, the automation rule identifies that if an identified state (e.g., included in the cluster of identified states) is detected, the corresponding controllable state is to be recreated/implemented (e.g., state of corresponding controllable device(s) modified to be the rule specified controllable device state). In some embodiments, the automation rule is updated periodically. For example, the automation rule is associated with an expiration time and the rule is to be renewed or deleted upon expiration.

Figure 5:
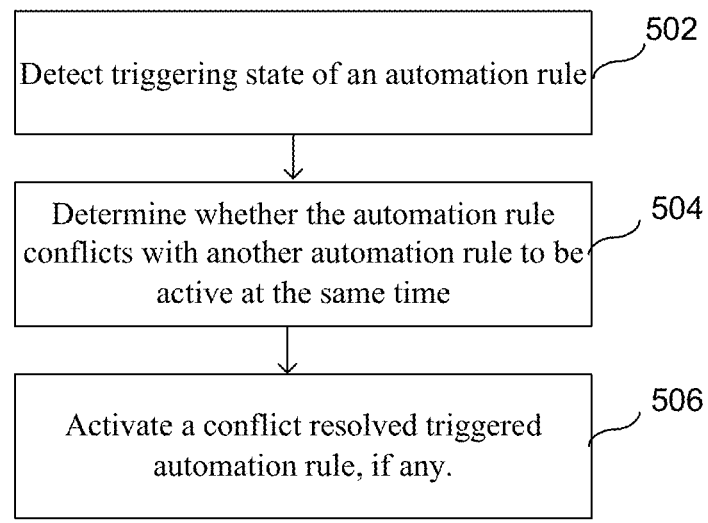
FIG. 5 is a flowchart illustrating an embodiment of a process for activating an automation rule.

FIG. 5 is a flowchart illustrating an embodiment of a process for activating an automation rule. The process of FIG. 5 may be at least in part implemented on hub 104 and/or server 106 of FIG. 1A. In some embodiments, the process of FIG. 5 is included in 208 of FIG. 2. In some embodiments, the process of FIG. 5 is performed periodically. In some embodiments, the process of FIG. 5 is performed dynamically. For example, the process of FIG. 5 is performed when a new state is identified (e.g., at 310 of FIG. 3).

At 502, the triggering state of an automation rule is detected. In some embodiments, the automation rule has been created in 406 of FIG. 4. In some embodiments, the automation rule has been preconfigured. For example, a programmer has manually configured the automation rule. In some embodiments, the triggering state has been identified in 310 of FIG. 3. In some embodiments, detecting the triggering state of the automation rule includes identifying that an identified state is included in a cluster of states that are to trigger the automation rule. In some embodiments, once an identified state has been identified as an actual state (e.g., in 310 of FIG. 3), a database of automation rules is searched/traversed to identify any automation rules that are to be triggered due to the identified actual state. In some embodiments, an identified state only triggers the automation rule in the event a likelihood (e.g., overall probability determined in 310 of FIG. 3) of the identified state being associated with an actual state meets a threshold. In some embodiments, the triggering state includes a state vector that includes one or more of the following: a time value, a weather forecast, a date value, and other data associated with time and/or environment conditions.

At 504, it is determined whether the automation rule conflicts with another automation rule to be active at the same time. For example, two or more automation rules are be activated because the identified state triggers these automation rules, but the rules specify conflicting controllable device states that cannot be all implemented at the same time (e.g., one rule specifies an "on" state while another rule specifies an "off" state). In some embodiments, the conflict is resolved. In some embodiments, the each automation rule is associated with a priority value that specifies a priority ordering in the event of a conflict. In some embodiments, the priority value of an automation rule is increased as the automation rule exists in a rule database for a longer period of time. For example, automation rules are dynamically updated and a rule that is renewed in the database is given priority over new rules because older rules have been validated over time. This may be implemented by increasing the priority of a rule every time the rule is revalidated and/or after a period of time passes since being included in a rule database. In some embodiments, a feedback received from a user is utilized to update a priority value of a rule. For example, the priority value is decreased in the event a user modifies a controllable device state to undo a modification to the controllable state caused by the rule being activated. In another example, the priority value is increased in the event a controllable device state is not modified after a modification to the controllable state caused by the rule being activated. In another example, a user may confirm via a user indication whether an activated automation rule is correct. For example, using a user device, a user may specify whether a recently activated automation rule has resulted in a correct automation behavior desired by the user (e.g., a positive indication increases priority value of the rule while a negative indication decreases priority value of the rule). In some embodiments, if the priority value of a rule is below a threshold, the rule is not eligible to be activated.

At 506, a conflict resolved triggered automation rule, if any, is activated. In some embodiments, for a group of conflicting automation rules, the automation rule with the highest priority value is activated. In some embodiments, activating an automation rule includes modifying state(s) of one or more controllable devices to be the state(s) specified by the activated automation rule. A feedback received from a user regarding the activation may be utilized to modify future activation of the rule.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for controlling network connected devices, including:
   a processor configured to:
      receive a first input from a plurality of sensors;
      determine a first state including a first location based on the first input, wherein the first state is associated with a first probability;
      receive a second input from the plurality of sensors;
      determine a second state including a second location based on the second input associated with a second probability;
      determine that the second state corresponds to an actual state based on a transition model and the second probability, wherein the transition model associates the first state with the second state and indicates a likelihood of a transition from the first state to the second state; and
      trigger a rule to change a state of at least one network connected device based on the second state, wherein changing the state of the at least one network connected device includes controlling the at least one network connected device based on the second state; and
   a memory coupled with the processor, wherein the memory is configured to provide the processor with instructions.

2. The system of claim 1, wherein the plurality of sensors includes a camera.

3. The system of claim 1, wherein the first state is a first state of a human subject and the second state is a second state of the human subject.

4. The system of claim 1, wherein the first state includes a first event and the second state includes a second event.

5. The system of claim 4, wherein the second activity is one of a plurality of human activities predefined to be recognizable.

6. The system of claim 4, wherein the second activity has been detected by computer vision analysis of a video image.

7. The system of claim 1, wherein the second probability identifies a likelihood the second state is the actual state.

8. The system of claim 1, wherein the first state has been identified as a previous valid state.

9. The system of claim 1, wherein determining that the second state corresponds to the actual state includes determining that the second probability meets a threshold value.

10. The system of claim 1, wherein the rule is based on a previous observation associated with the second state.

11. The system of claim 1, wherein the rule is based on a feedback from a previous trigger of the rule.

12. The system of claim 1, wherein the second state triggers a plurality of rules that conflict and the triggered rule has been selected for triggering based on a comparison of priority values of the plurality of rules.

13. The system of claim 1, wherein the transition model was generated using deep learning to analyze a history of state transitions.

14. The system of claim 1, wherein the processor is further configured to determine that a first sensor data and a second sensor data are associated with a same detected subject.

15. The system of claim 1, wherein determining that the second state corresponds to the actual state includes determining a correlation between components of the second state.

16. The system of claim 1, wherein the first state and the second state have been determined using machine learning.

17. The system of claim 1, wherein the rule was automatically generated based on observations detected using the plurality of the sensors.

18. The system of claim 1, wherein the first location identifies a physical location within a building.

19. The system of claim 1, wherein the first input and the second input are included in streaming inputs received from the plurality of sensors.

20. The system of claim 1, wherein changing the state of the at least one network connected device based on the second state includes sending a command to the at least one network connected device.

21. A method for controlling network connected devices, including:
   receiving a first input from a plurality of sensors;
   determining a first state including a first location based on the first input, wherein the first state is associated with a first probability;
   receiving a second input from the plurality of sensors;
   determining a second state including a second location based on the second input associated with a second probability;
   using a processor to determine that the second state corresponds to an actual state based on a transition model and the second probability, wherein the transition model associates the first state with the second state and indicates a likelihood of a transition from the first state to the second state; and
   triggering a rule to change a state of at least one network connected device based on the second state, wherein changing the state of the at least one network connected device includes controlling the at least one network connected device based on the second state.

22. A computer program product for controlling network connected devices, the computer program product being embodied in a non-transitory computer readable storage medium and comprising computer instructions for:
   receiving a first input from a plurality of sensors;

determining a first state including a first location based on the first input, wherein the first state is associated with a first probability;

receiving a second input from the plurality of sensors;

determining a second state including a second location based on the second input associated with a second probability;

determining that the second state corresponds to an actual state based on a transition model and the second probability, wherein the transition model associates the first state with the second state and indicates a likelihood of a transition from the first state to the second state; and triggering a rule to change a state of at least one network connected device based on the second state, wherein changing the state of the at least one network connected device includes controlling the at least one network connected device based on the second state.

* * * * *